United States Patent [19]

Bradbury

[11] 4,319,724

[45] Mar. 16, 1982

[54] LIGHTWEIGHT CABLE LADDER

[75] Inventor: Stanley A. Bradbury, London, England

[73] Assignee: Crouse-Hinds Company, Syracuse, N.Y.

[21] Appl. No.: 98,313

[22] Filed: Nov. 28, 1979

[51] Int. Cl.³ ............................................... F16L 3/00
[52] U.S. Cl. ...................................... 248/49; 248/68 R
[58] Field of Search ............. 248/49, 68 R; 174/68 C, 174/72 A; 403/359, 361

[56] References Cited

U.S. PATENT DOCUMENTS

| | | | |
|---|---|---|---|
| 2,923,510 | 2/1960 | Walch | 248/68 R |
| 2,979,298 | 4/1961 | Kenyon | 248/68 R X |
| 3,095,471 | 6/1963 | Price | 248/68 R |
| 3,521,843 | 7/1970 | Ogle | 248/68 R X |
| 3,730,570 | 5/1973 | Brochstein | 403/361 |
| 3,915,420 | 10/1975 | Norris | 248/68 R X |
| 3,938,767 | 2/1976 | Norris | 248/68 R X |
| 4,089,612 | 5/1978 | Mazzeo | 403/359 X |

FOREIGN PATENT DOCUMENTS

| | | | |
|---|---|---|---|
| 1540323 | 2/1970 | Fed. Rep. of Germany | 248/49 |
| 2353471 | 11/1974 | Fed. Rep. of Germany | 248/49 |
| 37418 | 6/1969 | Finland | 248/49 |
| 1222336 | 2/1971 | United Kingdom | 174/68 C |

Primary Examiner—J. Franklin Foss
Attorney, Agent, or Firm—Jacobi, Siegel, Presta, Marzullo & Aronson

[57] ABSTRACT

A lightweight cable support ladder comprising siderail members, preferably made from a lightweight material, and rungs, also preferably made from a lightweight material. The rungs are friction fitted into continuous slots in the siderail members and may be welded for added rigidity. The basic ladder may be preassembled in standard lengths. Joining members, which allow either horizontal or vertical changes in direction for the ladder, are friction-fitted into slots in the siderail members to provide for rapid, accurate, and rigid assembly. Hangers for either vertical or horizontal surfaces are also provided which snap-fit over the siderail members of the ladder. The rung members are provided with serrated or textured edges to provide a non-slipping attachment location for the cable ties positioning the cables on the ladder.

2 Claims, 9 Drawing Figures

LIGHTWEIGHT CABLE LADDER

BACKGROUND OF THE INVENTION

Cable support ladders are commonly used in many environments. They are extensively used in communications facilities, data processing and industrial installations for providing convenient conduits for power and instrumentation wiring. Cable ladders also provide quick and convenient access to cable systems for maintenance and for the addition to or alteration of the supported system.

The most commonly used cable ladder systems are made of steel or other heavy construction, and are bolted together to form extended runs. Vertical or horizontal changes in direction are also accomplished by means of bolted connections requiring considerable time as well as multiple parts to assemble. Cables, either singly or in bundles, are generally attached to the ladder rungs by means of standard cable ties. The smooth rungs used on conventional cable ladders lead to considerable difficulty in attaching cables so that they do not slide back and forth across the rungs. Especially in the case of small single cables, the tightness required on the cable ties to prevent shifting on the rung may be damaging to the cable or conduit.

SUMMARY OF THE INVENTION

The cable support ladder system of the present invention provides improvements over cable ladder systems presently in use in fabrication and installation, and in placement and securing of the supported cables.

The present cable support ladder system comprises a shaped lightweight material such as a lightweight alloy or reinforced plastic produced by extrusion or a glass fiber reinforced plastic produced by pultrusion, used for both siderail members, and rung members of a like material which interfit within slots in the siderail members. The rungs of the ladder system are provided with serrations or texturing on the edges thereof to provide non-slipping anchorage for the cable ties. Joining of the cable ladder sections for extended runs is accomplished by means of friction-fitted joining members fitted within opposed slots in the siderail members. Changing direction of the ladder system in the vertical plane is accomplished by means of preformed joining members which are provided in a variety of angle configurations. Changing direction of the ladder system in the horizontal plane is accomplished by bending of the standard running length connector to the desired angle. The connector that is used preferably is made from an alloy that work-hardens so that the angled connection forms a rigid joint. Hangers, formed from sections of alloy extrusions like that of the ladder, are provided for anchorage on either vertical or horizontal surfaces. The hangers snap-fit over the ladder wall members without use of tools.

DESCRIPTION OF THE PREFERRED EMBODIMENTS

Figure 1:
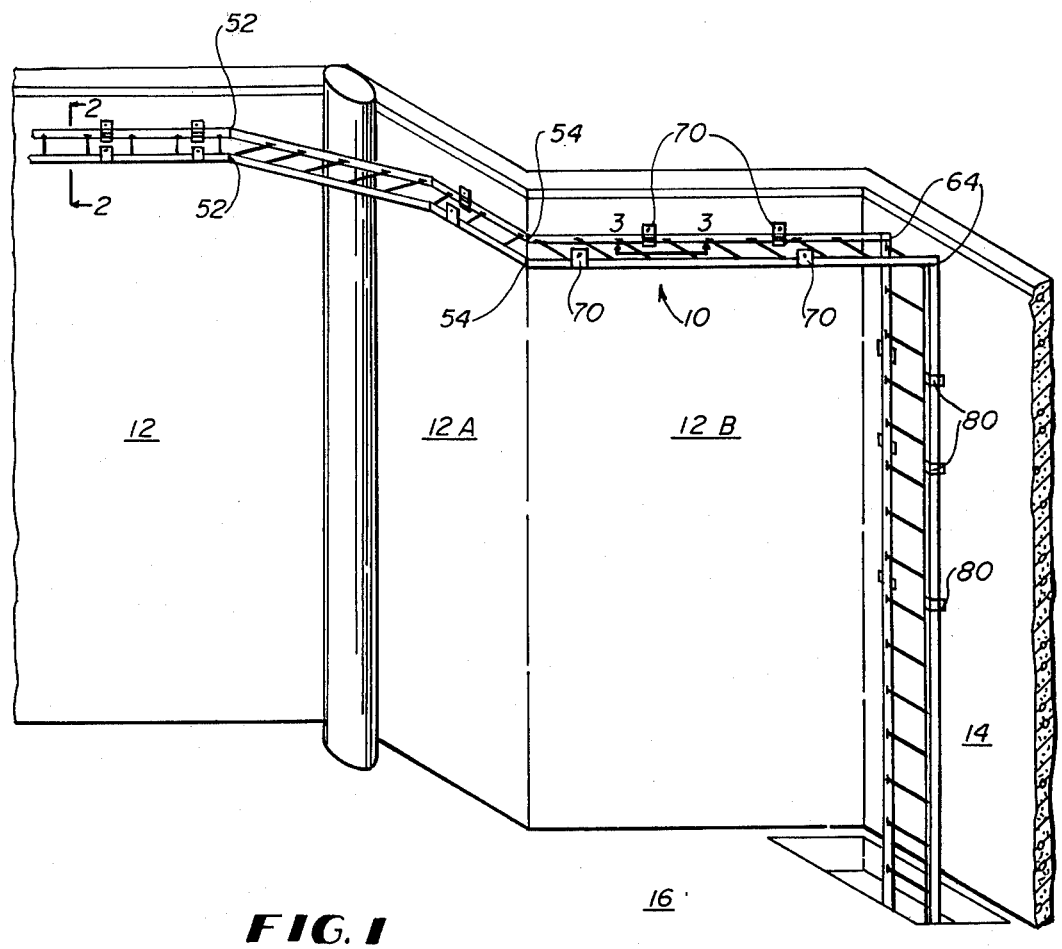
FIG. 1 is a perspective view of the cable ladder of the present invention in a typical installation.

In FIG. 1, a cable ladder system 10 is seen in a typical installation, e.g., running horizontally along walls 12, 12A, and 12B, and vertically along another wall 14 and through a floor 16. A preferred construction of the ladder system 10 will be more readily understood by reference to FIGS. 2 and 3 which illustrate a pair of siderail members 18 held in spaced relationship by rung members 20.

The siderail members 18 preferably are made from a shaped lightweight material such as a lightweight alloy or reinforced plastic produced by extrusion or a glass fiber reinforced plastic produced by pultrusion, such as an aluminum alloy, and each comprises a main web 22, a top flange 24, and a bottom flange 26. A pair of opposed slots or notches 28 are provided in the siderail members 18 which are defined by tabs or webs 30 and 32 extending toward each other from the top flange 24 and bottom flange 26, respectively, in substantially parallel relation to the main web 22.

A slot 34 is defined by a web 36 which extends from main web 22 substantially parallel to and spaced apart from the bottom flange 26. The web 36 preferably is shorter than the bottom flange 26.

Figure 3:
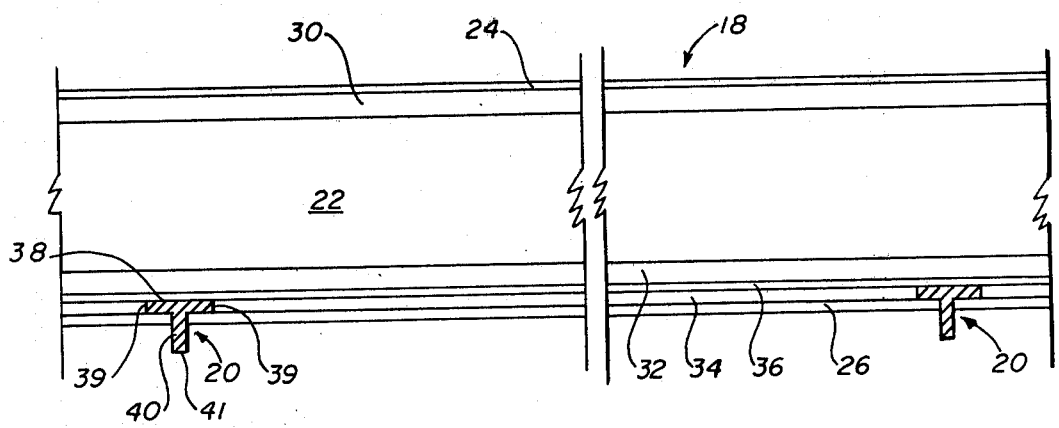
FIG. 3 is a sectional view taken generally along line 3—3 of FIG. 2.

The rung members 20 each comprise generally an extrusion of a lightweight material such as a lightweight alloy or other suitable material which may be the same as that of the siderail members 18. In cross section, each rung member 20 is shaped generally in a "T" with a generally planar top portion 38 and a depending stem portion 40, as shown in FIG. 3. The terminal edges 39 of the top portion 38 are preferably serrated, knurled or otherwise textured in any suitable manner. The terminal edge 41 of the stem portion 40 may also be serrated, knurled or textured if desired.

Figure 2:
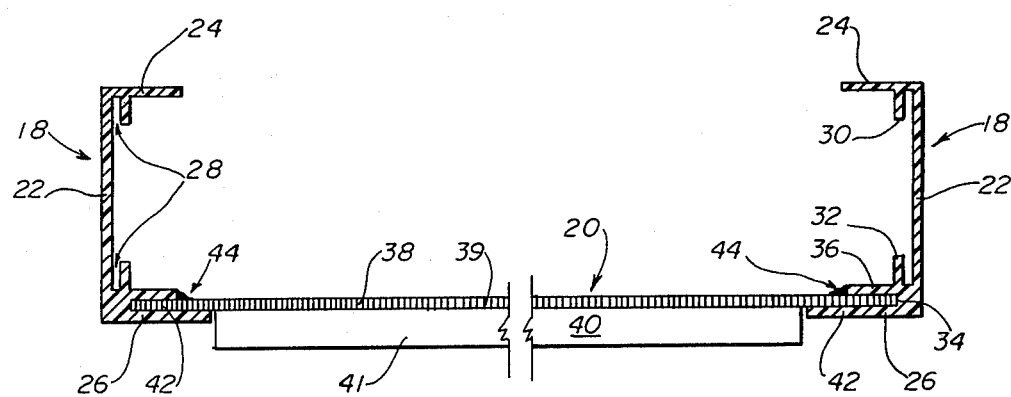
FIG. 2 is a sectional view taken generally along line 2—2 of FIG. 1.

To construct a section of the ladder 10, a pair of siderail members 18 of convenient lengths are positioned in spaced-apart, substantially parallel relationship with their slots 34 facing each other, as shown in FIG. 2. Sections of rung members 20 are cut to the desired length and a portion of the stem 40 is cut away from the top portion 38 for a distance generally equal to the distance from the base of slot 34 to the edge of bottom cord 26. The extending ends 42 of the rung member 20 are fitted into the slots 34 in the two parallel members 18 with the length of the rung members 20 preferably generally perpendicular to the siderail members 18. The thickness of the top portion 38 of the rung member 20 and the width of the slot 34 preferably are selected to produce a friction fit between the interfitting parts. Spot welding 44 or a suitable adhesive may be used to make the resulting structure rigid and permanently fastened together. Additional rung members 20 are positioned in a spaced-apart manner along the length of the parallel siderail members 18 in a like manner to form the basic ladder section structure.

Figure 4:
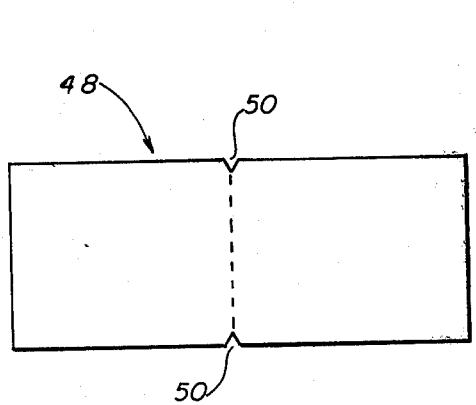
FIG. 4 is an elevational view of a connecting plate formed in accordance with the present invention.
Figure 5:
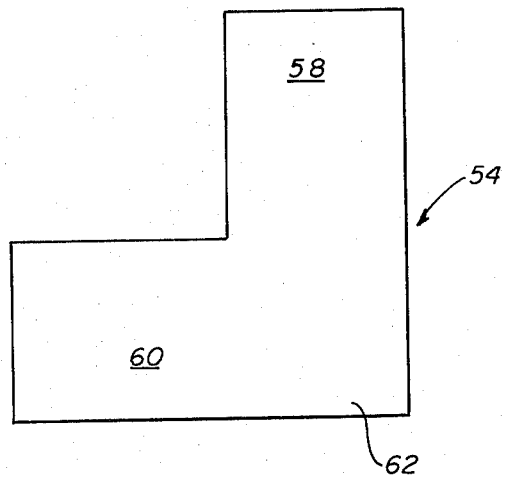
FIG. 5 is a side elevation of one form of a vertical angle connector.
Figure 6:
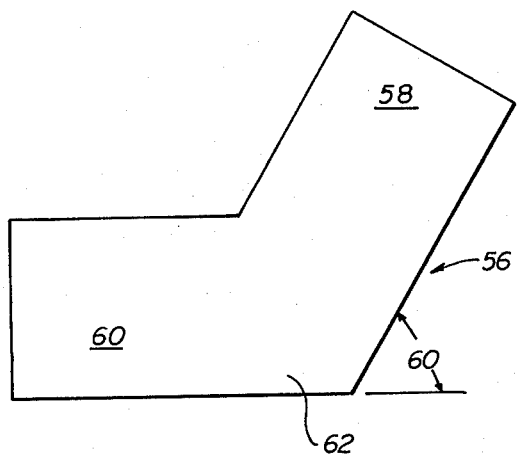
FIG. 6 is a side elevation of another form of a vertical angle connector.

As shown in FIGS. 4–6, a connecting plate 48 is provided to connect sections of the ladder into extended lengths. The connecting plate 48 preferably is formed of a lightweight material similar to the siderail members 18 and, more preferably, is formed of a lightweight alloy that work-hardens when bent, several of which are well known commercially. The connecting plate 48 (FIG. 4) generally comprises a flat rectangular plate with its width being essentially the same as the distance between the bases of the opposing slots 28 in siderail member 18. The thickness of connecting plate 48 preferably is equal to the width of the slots 28, and the length of connecting plate 48 is chosen to provide adequate material strength when installed, e.g., generally two to four times the width dimension. The connecting plate 48 preferably is provided with a pair of notches 50 disposed on either edge at approximately the center point of its length to serve as reference points.

Figure 4A:
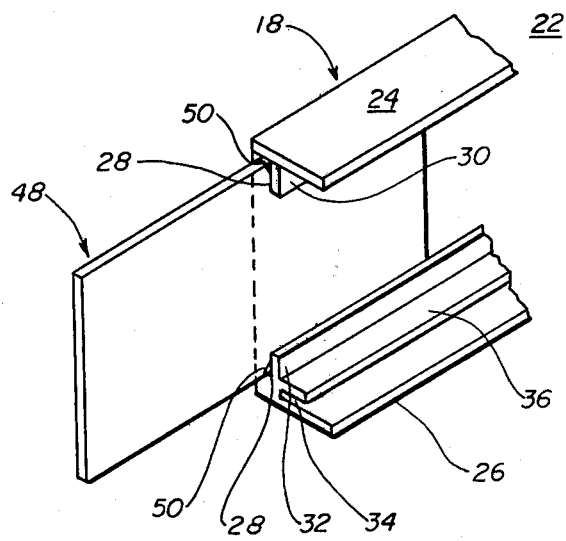
FIG. 4A is a perspective view of a siderail member with a connecting plate installed.

Connecting plates 48 preferably are used in pairs to provide rigid running-length connections between sections of the ladder 10 for constructing extended lengths. A connecting plate 48 is inserted into the channel formed by the opposing slots 28 in a siderail section 18 as far as the notches 50, as illustrated in FIG. 4A. This is repeated on the opposite siderail member 18 of the ladder section. The connecting plates 48 are fitted into the slots 28 in the next ladder section (not shown) until the ends of the connected wall sections 18 are abutting. The friction fit between the connecting plates 48 and the opposed slots 28 provides a secure mechanical joint.

When horizontal changes in direction are desired, as illustrated at points 52 and 54 in FIG. 1, the connecting plates 48 may be bent along a line indicated by the opposed notches 50 to the desired angle and installed as is usual for a straight running length connection. The connecting plates 48, being preferably made from a work hardening alloy, give additional rigidity to horizontal corners since the connecting plates 48 "set" along their bend line and resist further deformation along that line.

Changes in direction vertically are facilitated by use of connecting plates such as the plates 54 and 56 shown in FIGS. 5 and 6, respectively. Connecting plates 54 and 56 preferably are cut or stamped from a sheet of material similar to that for connecting plate 48. For each plate 54, 56 a pair of ends 58 and 60, each with dimensions essentially the same as one half of the length of connecting plate 48 are joined together by a web section 62 in a desired angular relationship. Use of the connecting plates 54 and 56 is essentially identical to the procedure followed for connecting plate 48, except that the resulting joint provides a change in direction of the ladder system 10 in a vertical plane such as that illustrated at point 64 in FIG. 1.

Figure 7:
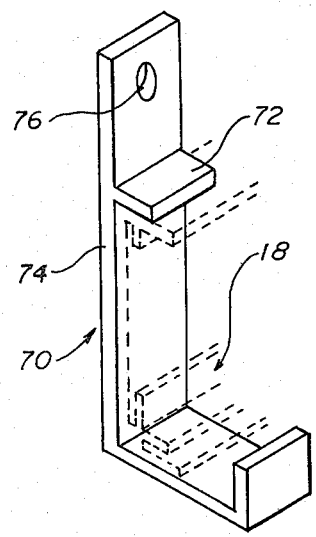
FIG. 7 is a perspective view of a first hanger unit.

A hanger 70 for installation of the ladder system 10 on vertical surfaces or for suspension of the ladder system 10 is illustrated in FIG. 7. The hanger 70 preferably is formed as an extrusion and comprises a generally "L" shaped extrusion with an additional short web 72 or tab extending from the long leg 74 of the "L". The hanger 70 is so dimensioned to engage the siderail member 18 (shown in broken lines) in a snap-fit relationship as shown. The long leg 70 is provided with a hole 76 through the portion that extends beyond the short web 72. The hole 76 may be used for fastening directly to a vertical wall or may be used to suspend the ladder system 10 from an overhead support structure.

Figure 8:
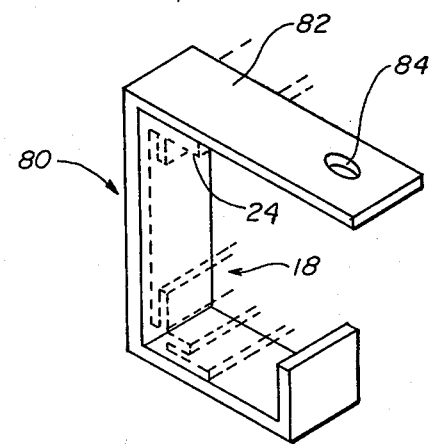
FIG. 8 is a perspective view of a second hanger unit.

A second hanger member 80 is shown in FIG. 8 and may be used for fastening the ladder system 10 to a wall as illustrated in FIG. 1. The hanger unit 80 preferably is made from a lightweight extrusion and has a generally "C"-shaped cross section. The hanger unit 80 is so dimensioned to snap-fit over the siderail member 18 (shown in broken lines), and the upper flange 82 thereof preferably is provided with a hole 84 in the portion that extends beyond the upper flange 24 of the siderail member 18.

Installation of the ladder system 10 of the present invention on a work site requires a minimum number of tools. A hacksaw may be used to cut the siderail members 18 to desired lengths or angles to accommodate the desired configuration. The connector plates 48, 54, and 56, being friction-fit, require no tools, and the hanger units 70 and 80, being snap-fitted over the siderails, also require no tools. Installation may be easily and quickly accomplished by fastening directly to walls or ceilings, or by suspension with the use of wires or conventional brackets as desired. The entire ladder system 10 is lightweight and requires a minimum of crew for installation.

What is claimed is:

1. A ladder for cables or the like that are adapted to be positioned thereon by ties, said ladder comprising:
    a pair of siderail members formed of a lightweight material, each having a first slot facing the other siderail member and a second slot substantially perpendicular to said first slot;
    a rung member formed of a lightweight material and having its end portions disposed in said first slots, said rung member having opposite side edges that are serrated to provide a non-slip anchorage for ties positioning the cables on the ladder;
    a connecting plate being receivable in said second slots of adjacent siderail members to connect them together, said connecting plate being formed of a bendable material and having notches in the opposite edge portions thereof defining a bend line therein, said connecting plate comprising end portions disposed at an angle to each other substantially along said bend line, and
    a hanger adapted to support a siderail member and to be connected to a support surface, said hanger being adapted to be snap-fitted over a siderail member.

2. The ladder of claim 1 wherein said rung member is substantially T-shaped in cross section, with all of the side edge portions thereof being serrated.

* * * * *